US009520968B2

(12) United States Patent
Wen et al.

(10) Patent No.: US 9,520,968 B2
(45) Date of Patent: Dec. 13, 2016

(54) METHOD FOR PERFORMING SEAMLESS TRANSMISSION CONTROL WITH AID OF REQUEST CARRYING FRAGMENT ID, AND ASSOCIATED APPARATUS

(71) Applicant: MEDIATEK INC., Hsin-Chu (TW)

(72) Inventors: Yuan-Chin Wen, Taipei (TW); Chiu-Yun Ko, Taipei (TW); Chih-Shi Yee, Hsinchu County (TW); Shun-Yong Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 154 days.

(21) Appl. No.: 14/067,933

(22) Filed: Oct. 30, 2013

(65) Prior Publication Data

US 2014/0355530 A1 Dec. 4, 2014

Related U.S. Application Data

(60) Provisional application No. 61/828,199, filed on May 29, 2013.

(51) Int. Cl.
*H04L 1/16* (2006.01)

(52) U.S. Cl.
CPC .................. *H04L 1/1628* (2013.01)

(58) Field of Classification Search
CPC ..... H04W 48/14; G06K 19/077; H04L 1/1628
See application file for complete search history.

(56) References Cited

U.S. PATENT DOCUMENTS

2009/0046682 A1* 2/2009 Kim et al. ............... 370/338
2009/0060200 A1* 3/2009 Sheu et al. .............. 380/278

FOREIGN PATENT DOCUMENTS

WO 0113542 A1 2/2001

OTHER PUBLICATIONS

Necati Canpolat et al., Network Selection-Normative text proposal, IEEE P802.11 Wireless LANs, Sep. 17, 2006, pp. 1-34, doc.: IEEE 802.11-06/1014r3, XP002478802.

* cited by examiner

*Primary Examiner* — Jianye Wu
(74) *Attorney, Agent, or Firm* — Winston Hsu; Scott Margo

(57) ABSTRACT

A method for performing seamless transmission control for an electronic device and an associated apparatus are provided, where the method includes the steps of: sending a request frame carrying a fragment identification (ID) to trigger a responder in a wireless network system to initiate retransmission corresponding to the fragment ID, wherein the fragment ID indicates beginning of a remaining portion within a plurality of fragments of data being sent from the responder to the electronic device; and receiving at least one response frame sent from the responder, for utilizing the remaining portion within the plurality of fragments of the data, wherein the remaining portion within the plurality of fragments of the data is obtained from the at least one response frame.

18 Claims, 5 Drawing Sheets

METHOD FOR PERFORMING SEAMLESS TRANSMISSION CONTROL WITH AID OF REQUEST CARRYING FRAGMENT ID, AND ASSOCIATED APPARATUS

CROSS REFERENCE TO RELATED APPLICATIONS

This application claims the benefit of U.S. Provisional Application No. 61/828,199, which was filed on May 29, 2013, and is included herein by reference.

BACKGROUND

The present invention relates to Generic Advertisement Service (GAS) in a wireless network system, and more particularly, to a method for performing seamless transmission control for an electronic device, and to an associated apparatus.

According to the related art, a conventional electronic device in a wireless network system can be designed to operate according to Institute of Electrical and Electronics Engineers (IEEE) 802.11u for Generic Advertisement Service (GAS) retransmission. However, during a GAS message sequence with GAS fragmentation, if one of the frames of the GAS Initial Request, the GAS Initial Response, the GAS Comeback Request, and the GAS Comeback Response in the transaction is lost, the conventional electronic device typically keeps waiting until timeout, and the whole transaction may need to restart again, causing the power consumption of the conventional electronic device to be increased. In another example, as the number of frame exchanges is typically proportional to the number of devices sending GAS-related frames, the total channel capacity of the wireless network system may be insufficient when there are many users. Thus, a novel method is required for improving transmission control of an electronic device in a wireless network system.

SUMMARY

It is an objective of the claimed invention to provide a method for performing seamless transmission control for an electronic device, and to an associated apparatus, in order to solve the above-mentioned problems.

It is another objective of the claimed invention to provide a method for performing seamless transmission control for an electronic device, and to an associated apparatus, in order to reduce the number of frame exchanges in a wireless network system.

According to at least one preferred embodiment, a method for performing seamless transmission control for an electronic device is provided, where the method comprises the steps of: sending a request frame carrying a fragment identification (ID) to trigger a responder in a wireless network system to initiate a transmission corresponding to the fragment ID, wherein the fragment ID indicates a beginning of a portion within a plurality of fragments of data; and receiving at least one response frame from the responder, wherein the portion within the plurality of fragments of the data is carried by the at least one response frame.

According to at least one preferred embodiment, an apparatus for performing seamless transmission control for an electronic device is provided, where the apparatus comprises at least one portion of the electronic device. The apparatus comprises a processing circuit arrange to control operations of the electronic device, and further comprises a transceiver arranged to transmit or receive information for the electronic device, wherein the processing circuit is coupled to the transceiver. In addition, the processing circuit sends, with the transceiver, a request frame carrying a fragment ID to trigger a responder to initiate a transmission corresponding to the fragment ID, wherein the fragment ID indicates a beginning of a portion within a plurality of fragments of data. Additionally, the processing circuit receives at least one response frame sent from the responder, for utilizing the portion within the plurality of fragments of the data, wherein the portion within the plurality of fragments of the data is carried by the at least one response frame.

According to at least one preferred embodiment, a method for performing seamless transmission control for an electronic device is provided, where the method is applied to a responder corresponding to the electronic device in a wireless network system, and the method comprises the steps of: upon trigger of a request frame carrying a fragment ID, the request frame received from the electronic device, initiating retransmission corresponding to the fragment ID for the electronic device, wherein the fragment ID indicates beginning of a remaining portion within a plurality of fragments of data being sent from the responder to the electronic device; and sending at least one response frame to the electronic device, allowing the electronic device to utilize the remaining portion within the plurality of fragments of the data, wherein the remaining portion within the plurality of fragments of the data is carried by the at least one response frame.

It is an advantage of the present invention that, by utilizing the present invention method and apparatus, the wireless network system can efficiently transmit data for GAS queries without retransmitting repeated portion(s) of the data. In addition, in comparison with the related art, the number of frame exchanges in a wireless network system is greatly reduced. As a result, the power consumption can be decreased, and the problem of insufficiency of the total channel capacity of the wireless network system can be prevented.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
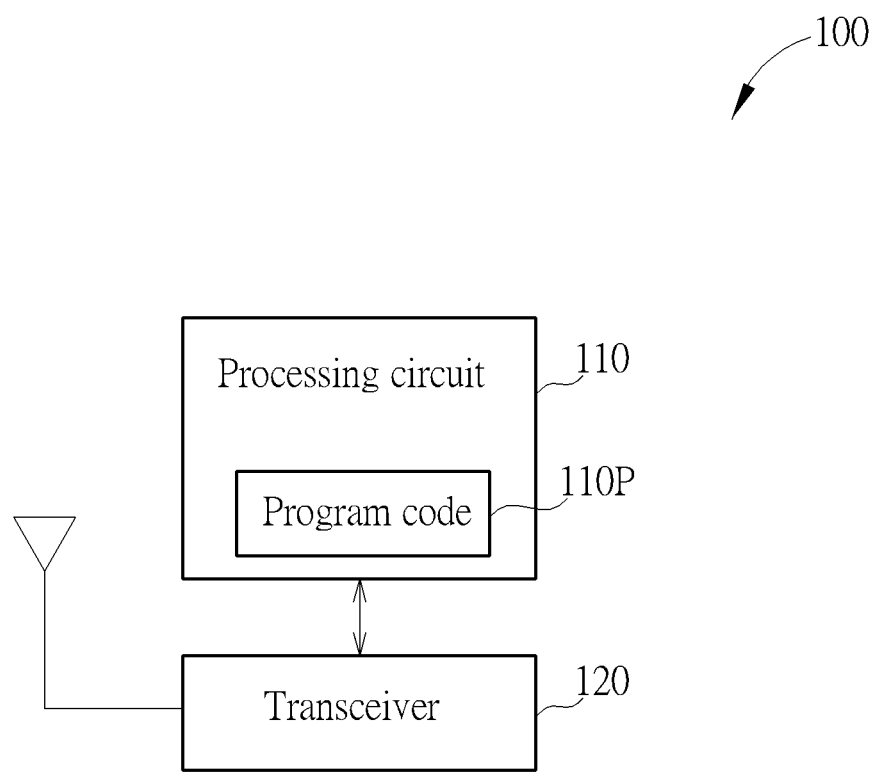
FIG. 1 is a diagram of an apparatus for performing seamless transmission control for an electronic device according to a first embodiment of the present invention.

Please refer to FIG. 1, which illustrates a diagram of an apparatus 100 for performing seamless transmission control for an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), a mobile computer (e.g. a tablet), and a personal computer such as a laptop computer.

As shown in FIG. 1, the apparatus 100 may comprise a processing circuit 110 arrange to control operations of the electronic device, and may further comprise a transceiver 120 arranged to transmit or receive information for the electronic device, where the transceiver 120 is coupled to the processing circuit 110, and one or more antennas of the electronic device may be coupled to the transceiver 120. For example, the processing circuit 110 may comprise at least one processor and associated hardware resources, and the transceiver 120 may comprise a transmitter and a receiver such as those for wireless network communications, where the processor may execute some program codes 110P retrieves from a storage module (e.g. a hard disk drive (HDD), or a non-volatile memory such as a Flash memory) within the electronic device to control the aforementioned operations of the electronic device.

According to this embodiment, the processing circuit 110 may send, by utilizing the transceiver 120, a request frame to trigger a peer device in a wireless network system to transmit data such as Generic Advertisement Service (GAS) data to the electronic device. Thus, the electronic device can be regarded as the requesting device, and the peer device can be regarded as the responding device, which can be referred to as the responder for brevity. Typically, as the data amount of the aforementioned data such as the GAS data may be too large to fit in a specific format, the data may be transmitted with fragmented portions of the data. For example, GAS fragmentation may be used. More particularly, in a situation where the transmission for the aforementioned data such as the GAS data is interrupted, the processing circuit 110 may send, by utilizing the transceiver 120, another request frame such as a request frame carrying fragmentation information regarding the non-transmitted data within the aforementioned data to the responder, in order to resume transmission for the non-transmitted data. As a result, the processing circuit 110 may eventually obtain and utilize the whole of the aforementioned data such as the GAS data. For example, the processing circuit 110 may control the electronic device (more particularly, a display module thereof, such as a touch-sensitive display panel of the electronic device) to display (or play back) the advertisement represented by the aforementioned data such as the GAS data. Regarding GAS fragmentation and related information such as GAS queries, etc., please refer to Institute of Electrical and Electronics Engineers (IEEE) 802.11 standards (e.g. "IEEE 802.11-2012" standards) for more information when needed.

Figure 2:
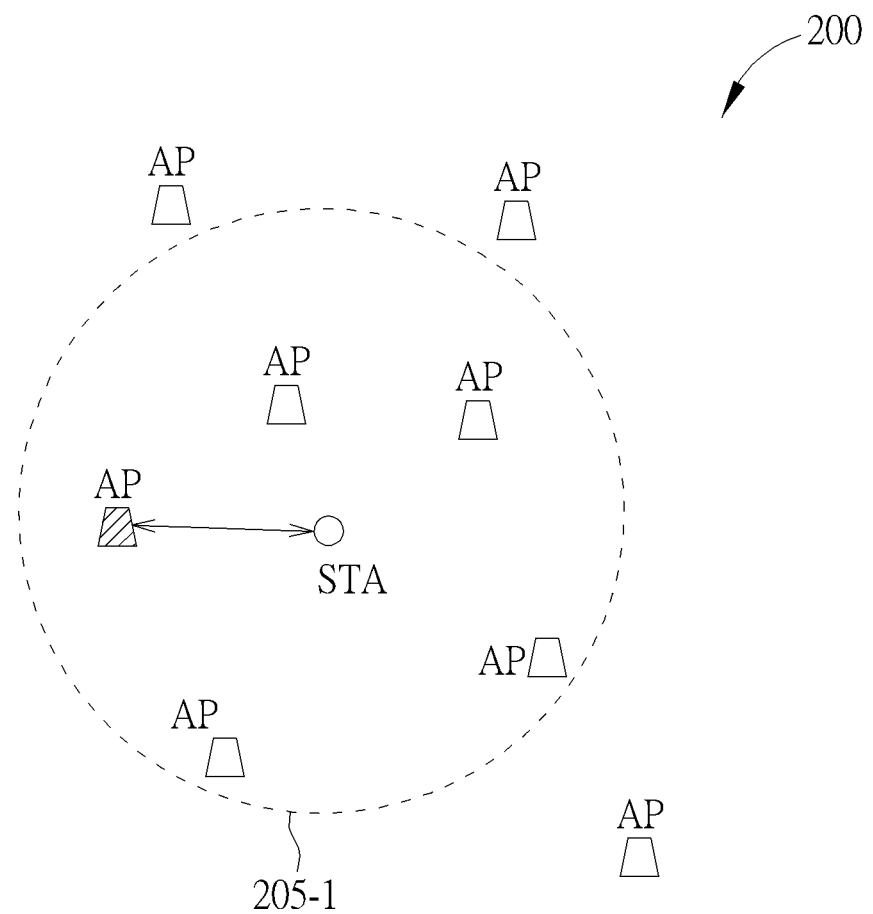
FIG. 2 illustrates a wireless network system comprising the aforementioned electronic device according to an embodiment of the present invention.

FIG. 2 illustrates a wireless network system 200 comprising the aforementioned electronic device of the embodiment shown in FIG. 1 according to an embodiment of the present invention, where the wireless network system 200 can be taken as an example of the aforementioned wireless network system in the embodiment shown in FIG. 1. According to this embodiment, the electronic device (labeled "STA" in FIG. 2, where the notation "STA" stands for "Station") may move from a point to another point since the user of the electronic device may carry the electronic device to walk around. For example, the user carrying the electronic device may walk to the center of the region 205-1, and the apparatus 100 may control the electronic device to send one or more requests to one of the peer devices (labeled "AP" in FIG. 2, where the notation "AP" stands for "Access Point") in the wireless network system 200 to retrieve the aforementioned data such as the GAS data.

Figure 3:
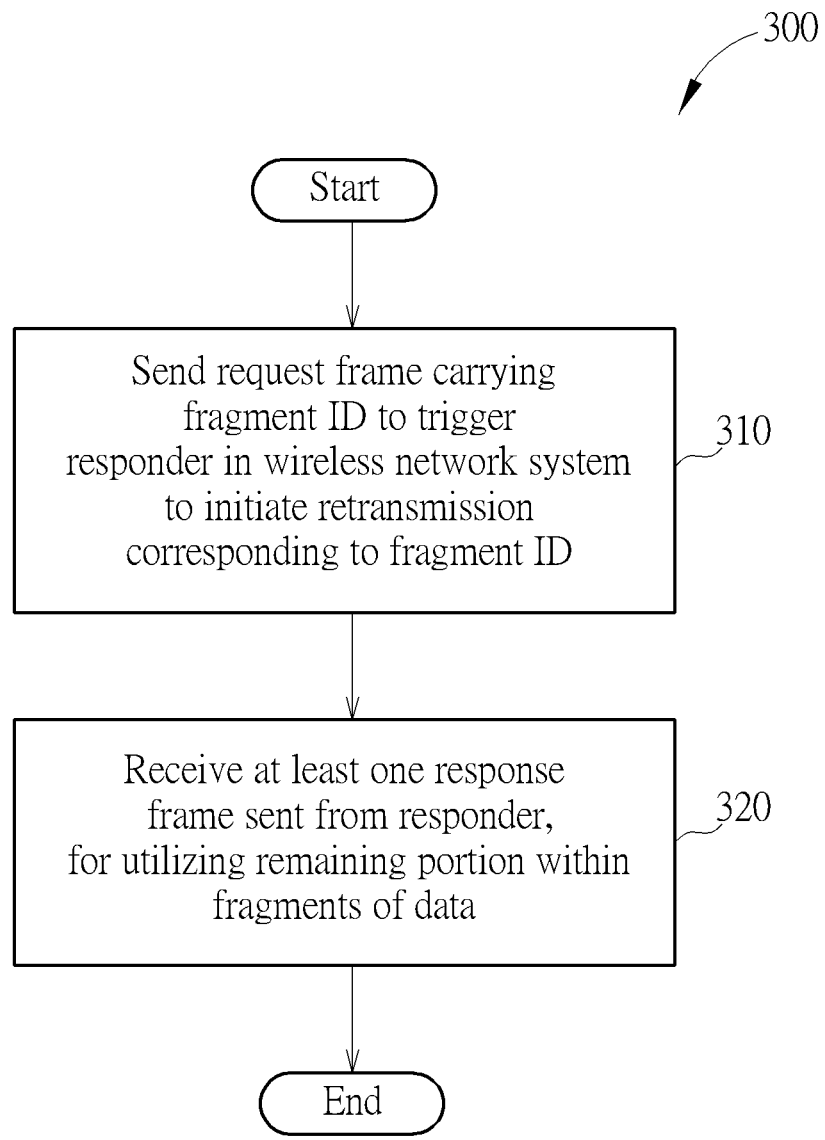
FIG. 3 illustrates a flowchart of a method for performing seamless transmission control for an electronic device according to an embodiment of the present invention.

FIG. 3 illustrates a flowchart of a method 300 for performing seamless transmission control for an electronic device according to an embodiment of the present invention. The method shown in FIG. 3 can be applied to the apparatus 100 shown in FIG. 1 (more particularly, the electronic device STA of the embodiment shown in FIG. 2), and can be applied to the processing circuit 110 thereof (more particularly, the processing circuit 110 executing the program codes 110P of the embodiment shown in FIG. 1). The method is described as follows.

In Step 310, the processing circuit 110 sends, by utilizing the transceiver 120, a request frame carrying a fragment ID to trigger a responder in a wireless network system to initiate retransmission corresponding to the fragment ID, where the fragment ID indicates the beginning of a remaining portion within a plurality of fragments of data being sent from the responder to the electronic device. For example, within the plurality of fragments of the data being sent from the responder to the electronic device, the $1^{st}$ fragment through to the $N^{th}$ fragment are successfully received by the electronic device. The remaining portion within the plurality of fragments of the data comprises the $(N+1)^{th}$ fragment through to the last fragment within the plurality of fragments. For example, the number of fragments within the plurality of fragments can be equal to M, where M may represent an integer that is greater than or equal to $(N+1)$. In this situation, the $M^{th}$ fragment within the plurality of fragments can be taken as an example of the last fragment mentioned above.

In Step 320, the processing circuit 110 receives at least one response frame sent from the responder, for utilizing the remaining portion within the plurality of fragments of the data, where the remaining portion within the plurality of fragments of the data is carried by the at least one response frame. For example, in a situation where the $1^{st}$ fragment through to the $N^{th}$ fragment within the plurality of fragments of the data mentioned in Step 310 are successfully received by the electronic device, the processing circuit 110 receives the aforementioned at least one response frame sent from the responder, in order to obtain the $(N+1)^{th}$ fragment through to the last fragment (e.g. the $M^{th}$ fragment mentioned above) within the plurality of fragments from the aforementioned at least one response frame.

As shown in FIG. 3, the operations of Step 320 are illustrated after that of Step 310. This is for illustrative purposes only, and is not meant to be a limitation of the present invention. For example, one or more operations may exist between the operations of Step 310 and the operations of Step 320, where the aforementioned one or more operations are not illustrated in FIG. 3 for brevity.

According to this embodiment, the processing circuit 110 may insert the fragment ID into a specific field of a GAS initial request frame, and may utilize the GAS initial request frame carrying the fragment ID as the request frame. More particularly, the aforementioned at least one response frame sent from the responder comprises at least one GAS comeback response frame. After sending the request frame carrying the fragment ID, the processing circuit 110 sends, with the transceiver 120, at least one GAS comeback request frame to the responder, in order to ask for the aforementioned at least one GAS comeback response frame. For example, in a situation where the $1^{st}$ fragment through to the $N^{th}$ fragment within the plurality of fragments of the data mentioned in Step 310 are successfully received by the electronic device, the aforementioned at least one GAS comeback response frame carries the $(N+1)^{th}$ fragment through to the last fragment within the plurality of fragments.

In practice, when the $1^{st}$ fragment through to the $N^{th}$ fragment within the plurality of fragments of the data mentioned in Step 310 are successfully received by the electronic device, the processing circuit 110 may set the fragment ID to be that of the $(N+1)^{th}$ fragment within the plurality of fragments. As mentioned, the remaining portion within the plurality of fragments of the data mentioned in Step 310 comprises the $(N+1)^{th}$ fragment through to the last fragment within the plurality of fragments. As a result, the electronic device can notify the responder of the beginning of the remaining portion within the plurality of fragments of the data mentioned in Step 310, i.e. the portion of fragments that is not successfully received by the electronic device before the request frame carrying the fragment ID is sent.

Figure 4:
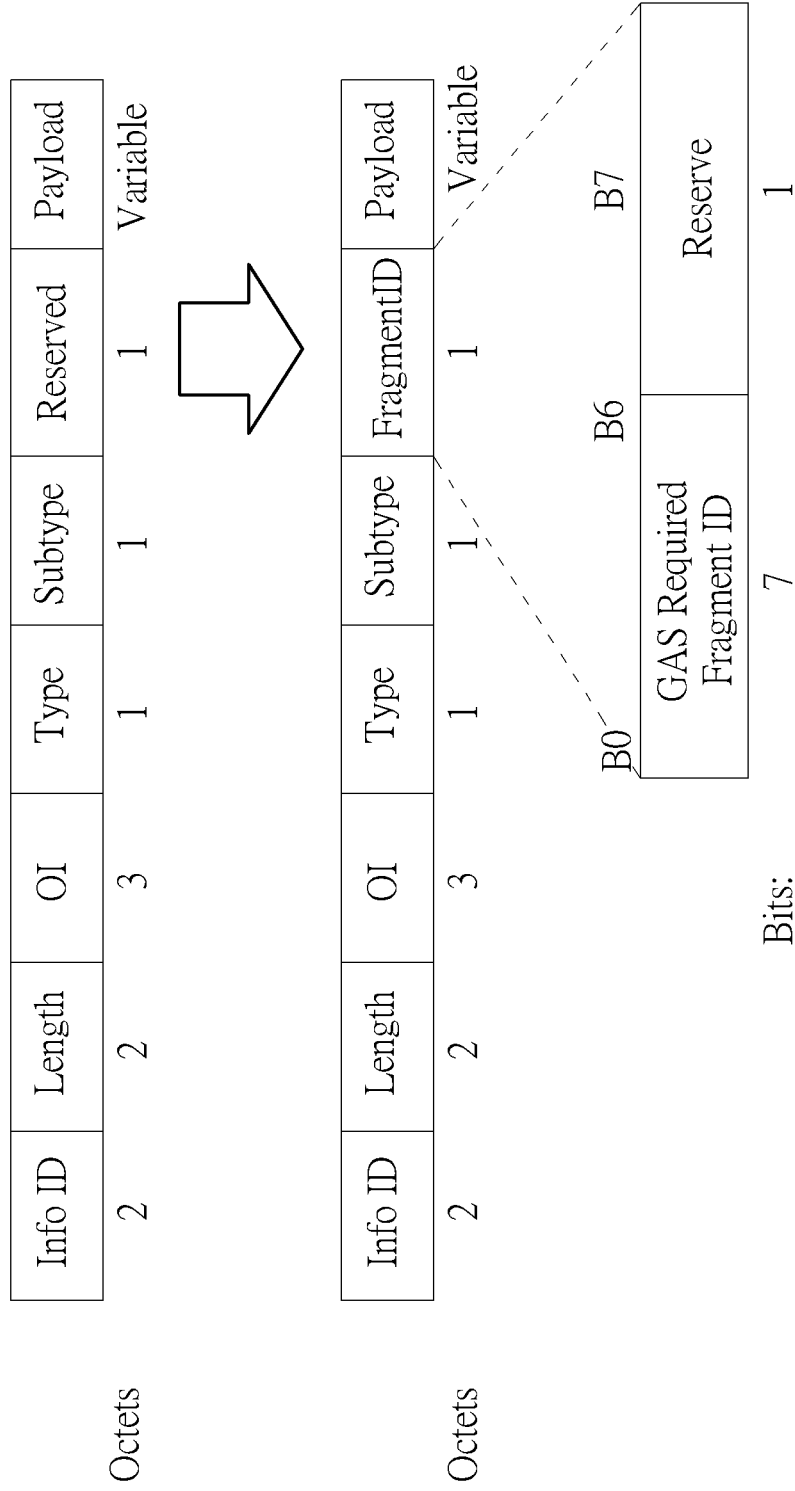
FIG. 4 illustrates a field arrangement scheme involved with the method shown in FIG. 3 according to an embodiment of the present invention.

FIG. 4 illustrates a field arrangement scheme involved with the method 300 shown in FIG. 3 according to an embodiment of the present invention. Please refer to the upper half of FIG. 4 first. According to the Hotspot (HS) 2.0 Access Network Query Protocol (ANQP) element format, the ANQP elements of this embodiment may comprise at least a 2-octet Info ID field and a 2-octet Length field. More particularly, in addition to the 2-octet Info ID field and the 2-octet Length field, the ANQP elements of this embodiment may further comprise a 3-octet OI field, a 1-octet Type field, a 1-octet Subtype field, a 1-octet Reserved field, and a Payload field of a variable length. As shown in FIG. 4, a portion of the new frame format of this embodiment (e.g. the lower half of FIG. 4) can be copied from the HS 2.0 ANQP element format (e.g. the upper half of FIG. 4), and therefore, the new frame format of this embodiment (e.g. the lower half of FIG. 4) may be partially the same as the HS 2.0 ANQP element format (e.g. the upper half of FIG. 4). In practice, at least one portion (e.g. a portion or all) of the Reserved field can be replaced by a GAS Required Fragment ID sub-field (which can also be referred to as the GAS Required Fragment ID field, when applicable) in the new frame format of this embodiment.

For example, when a portion of the Reserved field is replaced by the GAS Required Fragment ID sub-field, the length of the GAS Required Fragment ID sub-field can be less than 8 bits, and more particularly, can be 7 bits in this example, where the remaining 1 bit in this octet can be kept reserved. However, this is for illustrative purposes only, and is not meant to be a limitation of the present invention. In another example, the length of the GAS Required Fragment ID sub-field can be varied. In a further example, the length of the GAS Required Fragment ID sub-field can be equal to 8 bits, which means all (or the whole) of the Reserved field is replaced by the GAS Required Fragment ID sub-field, and therefore the GAS Required Fragment ID sub-field can also be referred to as the GAS Required Fragment ID field in this situation. No matter whether a portion or all of the Reserved field is replaced by the GAS Required Fragment ID sub-field, this octet of the new frame format of this embodiment can be labeled "FragmentID" in FIG. 4 for brevity, where field name "FragmentID" stands for Fragment ID, and therefore the FragmentID field of this embodiment can also be referred to as the Fragment ID field.

Please note that, when the new frame format of this embodiment (e.g. the lower half of FIG. 4) is applied, the aforementioned specific field can be arranged next to the Subtype field of the GAS initial request frame mentioned above. For example, the $1^{st}$ fragment through to the $N^{th}$ fragment within the plurality of fragments of the data mentioned in Step 310 are successfully received by the electronic device, and the transmission is interrupted due to some reasons. According to the method 300 shown in FIG. 3, the processing circuit 110 may insert the fragment ID of the $(N+1)^{th}$ fragment into the aforementioned specific field such as the FragmentID field of the GAS initial request frame, where the FragmentID field is next to the Subtype field of the GAS initial request frame based on the new frame format mentioned above.

According to some embodiments of the present invention, such as some variations of the embodiment shown in FIG. 3, before sending the request frame carrying the fragment ID (e.g. the fragment ID of the $(N+1)^{th}$ fragment) in Step 310, the processing circuit 110 may send, with the transceiver 120, another request frame carrying the fragment ID of the $1^{st}$ fragment within the plurality of fragments to trigger the responder to initiate transmission of all of the plurality of fragments, where the fragment ID carried by the request frame mentioned in Step 310 is typically different from that carried by the other request frame. More particularly, the other request frame can be another GAS initial request frame, which is sent before the GAS initial request frame mentioned in the embodiment shown in FIG. 3 is sent.

In another situation where the new frame format of the embodiment shown in FIG. 4 (e.g. the lower half of FIG. 4) is applied, before any retransmission operation for the data mentioned in Step 310 is performed, the FragmentID field in the other request frame can be arranged to carry the fragment ID of the $1^{st}$ fragment, and therefore the operation of triggering the responder to initiate the transmission of the whole of the plurality of fragments of the data mentioned in Step 310 can be performed based on the new frame format mentioned above. Therefore, the new frame format of the embodiment shown in FIG. 4 is suitable for triggering transmission of the first time for the data mentioned in Step 310, and is also suitable for triggering retransmission for the data mentioned in Step 310.

Figure 5:
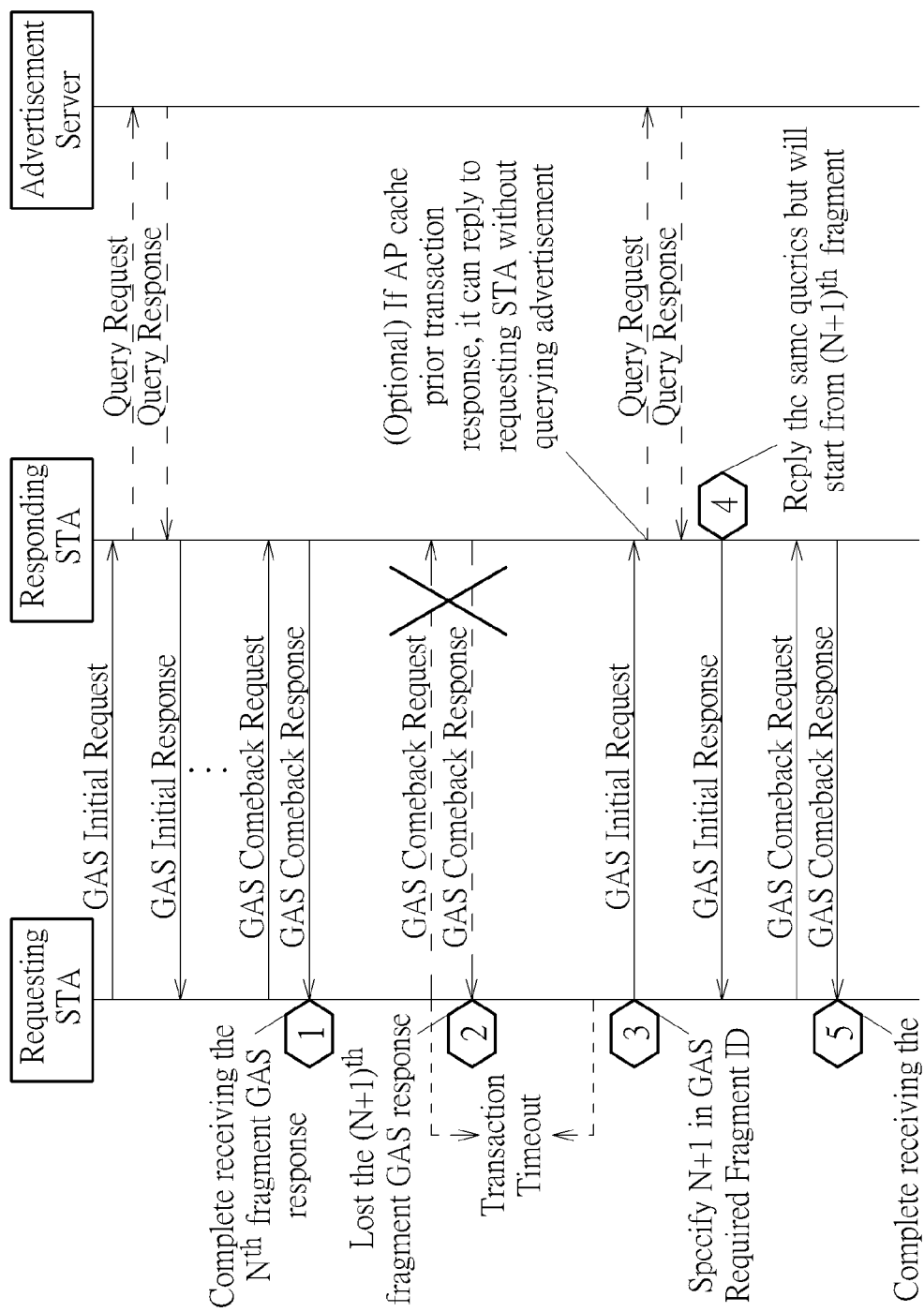
FIG. 5 illustrates a control scheme involved with the method shown in FIG. 3 according to an embodiment of the present invention.

FIG. 5 illustrates a control scheme involved with the method 300 shown in FIG. 3 according to an embodiment of the present invention, where the numbers labeled in some hexagons shown in FIG. 5 indicate some phases in the control scheme, such as Phase 1, Phase 2, Phase 3, Phase 4, and Phase 5. The requesting STA shown in FIG. 5 can be taken as an example of the electronic device mentioned above (more particularly, the electronic device that performs operations under control of the processing circuit 110), and the responding STA shown in FIG. 5 can be taken as an example of the responder mentioned above. In addition, the advertisement server is optional in this control scheme, and therefore the interactions between the responding STA and the advertisement server are illustrated with dashed lines. For example, the responding STA may cache the data in advance. In another example, the responding STA may send one or more query requests (more particularly, query request frames) to the advertisement server to ask for at least one portion (e.g. a portion or all) of the data when needed, and the advertisement server may send one or more query responses (more particularly, query response frames) corresponding to the aforementioned one or more query requests to the responding STA.

As shown in the upper left of FIG. 5, the requesting STA (i.e. the electronic device of this embodiment, such as the electronic device that performs operations under control of the processing circuit 110) may send, by utilizing the transceiver 120, the aforementioned other request frame carrying the fragment ID of the $1^{st}$ fragment, such as a GAS Initial Request frame (labeled "GAS Initial Request" in FIG. 5, for brevity) carrying the fragment ID of the $1^{st}$ fragment, to the responding STA, in order to trigger the responding STA to initiate the transmission of all of the plurality of fragments of the data mentioned in Step 310. The responding STA (i.e. the responder of this embodiment) may send the corresponding response frame such as a GAS Initial Response frame (labeled "GAS Initial Response" in FIG. 5, for brevity) to the requesting STA. Afterward, the requesting STA may send, by utilizing the transceiver 120, one or more request frames such as one or more GAS Comeback Request frames (labeled "GAS Comeback Request" in FIG. 5, for brevity) to ask for the $1^{st}$ fragment through to the $N^{th}$ fragment, respectively, and the responding STA may send the corresponding response frame(s) such as one or more GAS Comeback Response frames (labeled "GAS Comeback Response" in FIG. 5, for brevity) in response to the aforementioned one or more GAS Comeback Request frames, respectively. For example, the $1^{st}$ fragment through to the $N^{th}$ fragment within the plurality of fragments of the data mentioned in Step 310 have been successfully received by the electronic device at Phase 1 (labeled "Complete receiving the $N^{th}$ fragment GAS response" in FIG. 5, for better comprehension).

Afterward, the requesting STA may send a request frame such as a GAS Comeback Request frame (labeled "GAS Comeback Request" in FIG. 5, for brevity) to ask for the $(N+1)^{th}$ fragment. For example, this GAS Comeback Request frame is not successfully received by the responding STA due to some reason(s). In another example, this GAS Comeback Request frame is successfully received by the responding STA, but when the responding STA then sends the corresponding response frame such as a GAS Comeback Response frame (labeled "GAS Comeback Response" in FIG. 5, for brevity) in response to this GAS Comeback Request frame, this GAS Comeback Response frame is not successfully received by the requesting STA. No matter whether this GAS Comeback Request frame is successfully received by the responding STA or not, the $(N+1)^{th}$ fragment is lost at Phase 2 (labeled "Lost the $(N+1)^{th}$ fragment GAS response" in FIG. 5, for better comprehension). As a result, transaction timeout occurs.

When it is detected that the transaction timeout occurs, the requesting STA may operate according to the working flow shown in FIG. 3, where Phase 3 may correspond to at least one portion (e.g. a portion or all) of the operations of Step 310, and Phase 5 may correspond to at least one portion (e.g. a portion or all) of the operations of Step 320. For example, the processing circuit 110 may send, by utilizing the transceiver 120, the request frame carrying the fragment ID of the $(N+1)^{th}$ fragment, such as a GAS Initial Request frame (labeled "GAS Initial Request" in FIG. 5, for brevity) carrying the fragment ID of the $(N+1)^{th}$ fragment, to trigger the responding STA to initiate retransmission corresponding to the fragment ID of the $(N+1)^{th}$ fragment at Phase 3 (labeled "Specify N+1 in GAS Required Fragment ID" in FIG. 5, for better comprehension), in order to ask for retransmission of the aforementioned remaining portion starting from the $(N+1)^{th}$ fragment. For example, the responding STA (e.g. an AP such as that of the embodiment shown in FIG. 2) may send a query request (more particularly, a query request frame) to the advertisement server to ask for a portion of the data when needed, and the advertisement server may send a query response (more particularly, a query response frame) corresponding to this query request to the responding STA. This is optional since the portion of the data may have been cached in the responding STA, and the responding STA can reply to the requesting STA without querying the advertisement server if the responding STA (e.g. the AP) has cached the $(N+1)^{th}$ of the prior transaction response (labeled "(Optional) If AP cache prior transaction response, it can reply to requesting STA without querying advertisement" in FIG. 5, for better comprehension).

In response to the request frame carrying the fragment ID of the $(N+1)^{th}$ fragment (e.g. the GAS Initial Request frame sent at Phase 3 in this embodiment), the responding STA may send the corresponding response frame such as a GAS Initial Response frame (labeled "GAS Initial Response" in FIG. 5, for brevity) to the requesting STA, in order to reply the same queries with the aforementioned remaining portion starting from the $(N+1)^{th}$ fragment at Phase 4 (labeled "Reply the same queries but will start from $(N+1)^{th}$ fragment" in FIG. 5, for better comprehension). Afterward, the requesting STA may send, by utilizing the transceiver 120, a request frame such as a GAS Comeback Request frame (labeled "GAS Comeback Request" in FIG. 5, for brevity) to ask for the $(N+1)^{th}$ fragment. In response to this GAS Comeback Request frame, the responding STA may send the corresponding response frame such as a GAS Comeback Response frame (labeled "GAS Comeback Response" in FIG. 5, for brevity), in order to retransmit the $(N+1)^{th}$ fragment. As a result of the retransmission starting from the $(N+1)^{th}$ fragment, the $(N+1)^{th}$ fragment is successfully received by the requesting STA at Phase 5 (labeled "Complete receiving the $(N+1)^{th}$ fragment GAS response" in FIG. 5, for better comprehension). For example, in a situation where no transaction timeout occur during the retransmission starting from the $(N+1)^{th}$ fragment, the $(N+1)^{th}$ fragment through to the last fragment (e.g. the $M^{th}$ fragment mentioned above) within the plurality of fragments can be successfully received by the requesting STA. Therefore, the wireless network system can efficiently transmitting the data for GAS queries without retransmitting repeated portion(s) of the data (e.g. the $1^{st}$ fragment through to the $N^{th}$ fragment). In addition, in comparison with the related art, the number of frame exchanges in the wireless network system is greatly reduced. As a result, the power consumption of the electronic device such as the requesting STA can be decreased, and the problem of insufficiency of the total channel capacity of the wireless network system can be prevented.

According to the embodiments described above, a method for performing seamless transmission control for the electronic device is further provided, where this method is applied to the responder corresponding to the electronic device in the wireless network system, and the method may comprise the steps of: upon trigger of a request frame carrying a fragment ID, the request frame received from the electronic device (e.g. the request frame mentioned in Step 310), initiating retransmission corresponding to the fragment ID for the electronic device, where the fragment ID indicates the beginning of the aforementioned remaining portion within the plurality of fragments of the data being sent from the responder to the electronic device; and sending at least one response frame to the electronic device (e.g. the at least one response frame mentioned in Step 320), allowing the electronic device to utilize the remaining portion within the plurality of fragments of the data, where the remaining portion within the plurality of fragments of the data is carried by the aforementioned at least one response frame. For example, the responder such as the responding STA may comprise similar architecture as that of the apparatus 100 shown in FIG. 1, and more particularly, may comprise at least one processor executing associated program code(s) corresponding to this method of the responder. Thus, the aforementioned at least one processor executing the associated program code(s) corresponding to this method of the responder is capable of, upon trigger of the request frame carrying the fragment ID (e.g. the request frame mentioned in Step 310), initiating the retransmission corresponding to the fragment ID for the electronic device, and further sending the aforementioned at least one response frame to the electronic device (e.g. the at least one response frame mentioned in Step 320), allowing the electronic device to utilize the remaining portion within the plurality of fragments of the data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing seamless transmission control for an electronic device in a wireless network system, wherein the electronic device sends a first Initial Request for Generic Advertisement Service (GAS) data to an Access Point (AP), and when a first response of the first Initial Request is received from the AP, data transmission between the AP and the electronic device is initiated such that fragments of GAS data are sent from the AP to the electronic device in response to respective Comeback Requests sent from the electronic device, the method comprising the steps of:

sending a Comeback Request to the AP for a fragment of GAS data;
starting a timer;
sending a second Initial Request to the AP when timeout is reached before the fragment of GAS data is received from the AP, wherein the second Initial request carries a fragment ID corresponding to the fragment of GAS data;
receiving a second response from the AP; and re-initiating transmission between the AP and the electronic device such that fragments of GAS data are sent from the AP to the electronic device beginning with the fragment of GAS data.

2. The method of claim 1, wherein the step of sending a second Initial request carrying the fragment ID corresponding to the fragment of GAS data comprises:

inserting the fragment ID into a specific field of a Generic Advertisement Service (GAS) initial request frame; and
utilizing the GAS initial request frame carrying the fragment ID as the second Initial request.

3. The method of claim 2, wherein the step of re-initiating transmission further comprises:

after sending the second Initial request carrying the fragment ID, sending at least one GAS comeback request frame to the AP, in order to ask for at least one GAS comeback response frame carrying the fragment of GAS data.

4. The method of claim 2, wherein within the fragments of the data being sent from the AP to the electronic device, a $1_{st}$ fragment through to an $N_{th}$ fragment are successfully received by the electronic device before the second Initial request carrying the fragment ID is sent; and the method further comprises:

setting the fragment ID to be that of an $(N+1)_{th}$ fragment within the fragments.

5. The method of claim 4, wherein the fragment of data within the fragments of the data comprises the $(N+1)_{th}$ fragment through to a last fragment within the plurality of fragments.

6. The method of claim 2, wherein the specific field is next to a Subtype field of the GAS initial request frame.

7. The method of claim 1, wherein a first Comeback request carries a fragment ID of a $1_{st}$ fragment within the fragments to trigger the AP to initiate transmission of all of the plurality of fragments.

8. The method of claim 7, wherein the fragment ID carried by the second Initial request is different from that carried by the first Comeback request.

9. The method of claim 7, wherein within the fragments of the data being sent from the AP to the electronic device, the $1_{st}$ fragment through to an $N_{th}$ fragment are successfully received by the electronic device before the second Initial request carrying the fragment ID is sent.

10. An apparatus for performing seamless transmission control for an electronic device in a wireless network system, the apparatus comprises at least one portion of the electronic device, the apparatus comprising:

a transceiver arranged to transmit information to an Access Point (AP) or receive information from the AP for the electronic device; and
a processing circuit, coupled to the transceiver, arranged to control operations of the electronic device, wherein when the processing circuit sends, with the transceiver, a first Initial Request for Generic Advertisement Service (GAS) data to an Access Point (AP), and a first response of the first Initial Request is received from the AP, data transmission between the AP and the electronic device is initiated such that fragments of GAS data are sent from the AP to the electronic device in response to respective Comeback Requests sent from the electronic device, when a Comeback Request for a fragment of GAS data is sent, a timer is started and timeout is reached before the fragment of GAS data is received from the AP, the processing circuit sends, with the transceiver, a second Initial request to the AP, wherein the second Initial request carries a fragment ID corresponding to the fragment of GAS data, the processing circuit further receives a second response sent from the AP and re-initiates transmission between the AP and the electronic device such that fragments of GAS data are sent from the AP to the electronic device beginning with the fragment of GAS data.

11. The apparatus of claim 10, wherein the processing circuit inserts the fragment ID into a specific field of a Generic Advertisement Service (GAS) initial request frame, and utilizes the GAS initial request frame carrying the fragment ID as the second Initial request.

12. The apparatus of claim 11, wherein the processing circuit re-initiates transmission between the AP and the electronic device by, after sending the second Initial request carrying the fragment ID, the processing circuit sends, with the transceiver, at least one GAS comeback request frame to the AP, in order to ask for at least one GAS comeback response frame carrying the fragment of GAS data.

13. The apparatus of claim 11, wherein within the fragments of the data, a $1_{st}$ fragment through to an $N_{th}$ fragment are successfully received by the electronic device before the second Initial request carrying the fragment ID is sent;

and the processing circuit sets the fragment ID to be that of an $(N+1)_{th}$ fragment within the fragments.

14. The apparatus of claim 13, wherein the fragment within the fragments of the data comprises the $(N+1)_{th}$ fragment through to a last fragment within the fragments.

15. The apparatus of claim 11, wherein the specific field is next to a Subtype field of the GAS initial request frame.

16. The apparatus of claim 10, wherein a first Comeback request carries a fragment ID of a $1_{st}$ fragment within the fragments to trigger the AP to initiate transmission of all of the fragments.

17. The apparatus of claim 16, wherein the fragment ID carried by the second Initial request is different from that carried by the first Comeback request.

18. The apparatus of claim 16, wherein within the fragments of the data being sent from the AP to the electronic device, the $1_{st}$ fragment through to an $N_{th}$ fragment are successfully received by the electronic device before the second Initial request carrying the fragment ID is sent.

\* \* \* \* \*